Jan. 2, 1968 M. PILLARD 3,361,182
AIR DISTRIBUTORS OF BURNERS FOR SOLID, LIQUID OR GASEOUS FUEL
Filed Sept. 3, 1965 3 Sheets-Sheet 1

INVENTOR:
MARCEL PILLARD

United States Patent Office 3,361,182
Patented Jan. 2, 1968

3,361,182
AIR DISTRIBUTORS OF BURNERS FOR SOLID, LIQUID OR GASEOUS FUEL
Marcel Pillard, Marseilles, France, assignor to Entreprise Generale de Chauffage Industriel Pillard Freres & Cie Societe Anonyme, Marseilles, France
Filed Sept. 3, 1965, Ser. No. 484,804
Claims priority, application France, May 31, 1965, 20,942
1 Claim. (Cl. 158—1.5)

This application is a continuation-in-part of my copending application Ser. No. 424,881, filed Dec. 24, 1964, now abandoned.

The main essential condition for the combustion of coal and of liquid fuels, after they have been finely pulverized, and for that of gases, after they have been carefully diffused, is rapid and homogeneous contact of the combustion air with the particles of fuel, which, owing to their fineness have large oxidation surfaces.

The second essential condition for combustion, in this pulverized or diffused form, is that air should be added in a direction and under conditions which, owing to a certain low pressure in the zone where the flame commences, ensure that the latter will be "caught up" and will be sufficiently stable for the continuity required in the process of oxidation and in that of the release of calories.

Figure 1:
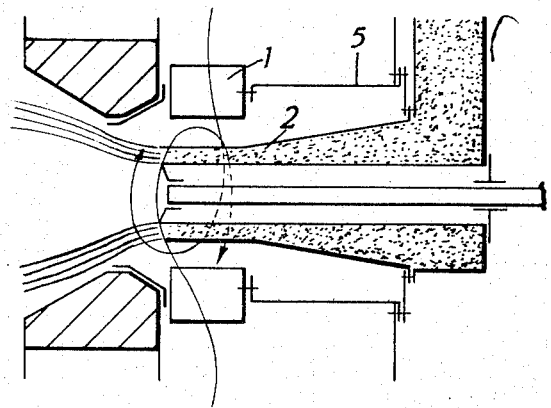
Figure 2:
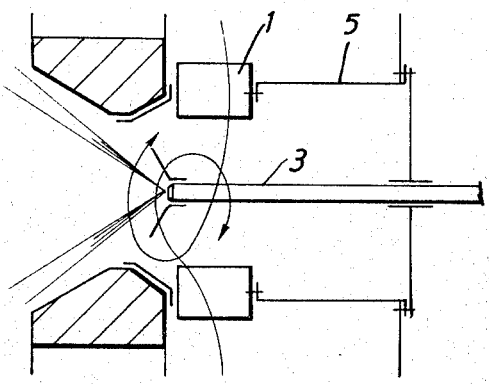
Figure 3:
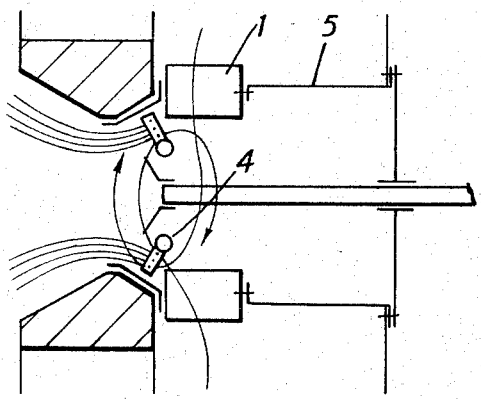
Figure 4:
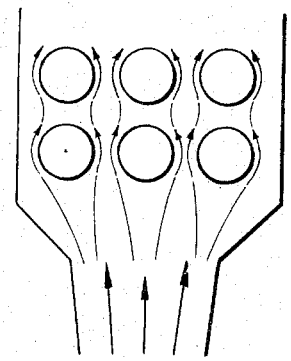

To ensure the fulfillment of these two requirements, the industrial combustion assemblies generally constructed have comprised, in the vicinity of their terminal portion, air rotation blades 1, adjustable in their angle of inclination, and these blades, according to whether the fuel to be burnt consists of powdered coal, as in FIG. 1, of liquid fuel, as in FIGS. 2, 3 or 4, suitable for the additional supply, the pulverization or the diffusion of the fuel to be consumed.

These adjustable rotation blades, often termed "air guides," cause the air emanating from the air box surrounding the apparatus to take a centripetal, longitudinal and tangential direction, of which the purpose is to enable it to make impact on the fuel particles, to produce the low pressure required to enable the flame to "catch" and to ensure the optimum ratio between the length and the diameter of the said flame.

A further function of the aforementioned adjustable "air guides" is to ensure that at the end of their travel the items of apparatus will be sealed up, when this is necessary for various reasons.

The first drawback to which this system has been found to be subject in practice is that owing to its considerable volume the rear part of each item of apparatus 5 occupies excessive space in the air box and that in installations including several burners this results in variable pressure losses in the different air delivery zones, and the system therefore does not make it possible, around each item of apparatus, to equalize the air fed to it, as shown in FIG. 4.

The respective items of apparatus then include zones fed with an excessive quantity of air or zones provided with insufficient air, as the case may be, and these zones make it impossible to ensure fully satisfactory combustion processes.

Figure 10:
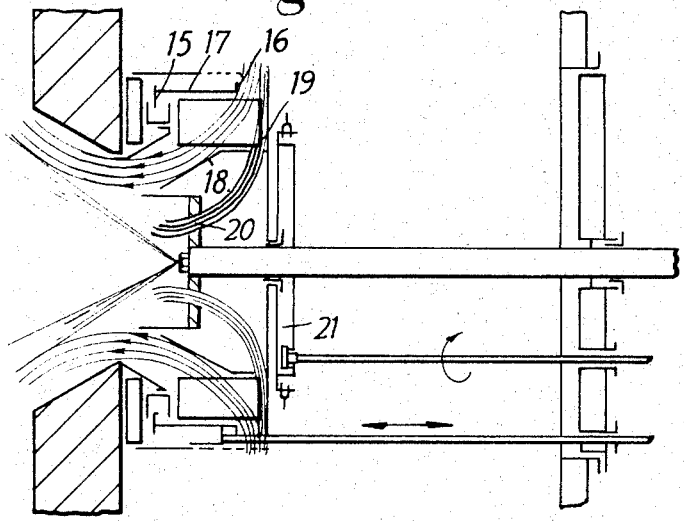

This drawback has been overcome by installing a short apparatus in front of each air box, on the boiler side and affixing it to the front surface of the boiler, and by not connecting the rear part of the box with the said "dissociated" equipment, as shown in FIG. 10, except by the central pipe, or by the said central pipe and little columns forming a system of struts, at the same time giving passage to air between them and also enabling a certain relative movement to take place between the front surface of the boiler and that of the air box, this relative movement being inevitable as a result of the expansion differences.

It has also been found that, as is obvious even if the moving air guides fairly satisfactorily perform their function of guiding the streams of air, it is difficult, if not impossible, to cause them to perform the additional task of sealing up the apparatus, at the end of their travel, owing to the leakages and deformations inevitable in this complex and mechanical assembly subjected to a temperature which is generally considerable.

Figure 5:
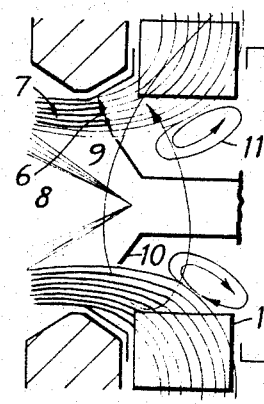
Figure 6:
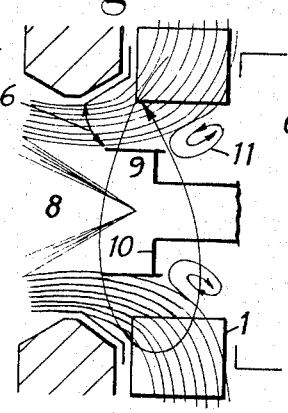
Figure 7:
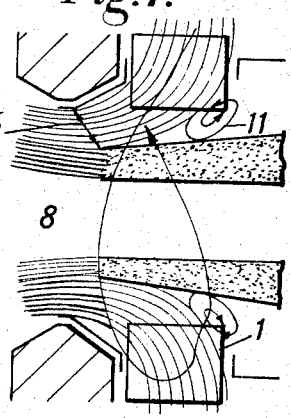

Between the air guide blades and the outlet section 6 left free between the air control device and the central part of the equipment—which central part terminates either in a conical deflector 10, as in FIG. 5, or by a box-shaped deflector, as in FIG. 6, or in a delivery nozzle in the case of powdered coal, as in FIG. 7—the air rotates in its flow, around the axis of the equipment, in a longitudinal direction, thus forming a flux, shown by black lines in FIGS. 5, 6 and 7, this flux being in accordance with the fundamental laws governing the flow of fluids.

Since at the low pressures adopted the compression of the air is negligible, the flow will be substantially in accordance with the Bernouilli Theorem, with a "neck" towards 7, downstream from the outlet section 6, and in the stream of air between 6 and 7 there will be a static pressure which will be the greater, the lower the speed.

Owing to this situation the static pressure at 6 is greater than the static pressure prevailing at 8 in the combustion chamber and, a fortiori, greater than that prevailing at 9, behind the flame deflectors 10, as shown in FIGS. 5 and 6, and it is found that the flame becomes narrower and longer, instead of spreading out, and also that the fuel does not reach the external air filters, and this leads to imperfect combustion processes, owing to the presence of zones with excess air side-by-side with central zones with excess fuel.

Furthermore, induced eddies form at 11, and these impede the delivery of the air, so that the speed reduction is rendered still more serious, the pressure of the streams nearest to the centre thus being increased.

In order to combat this difficulty and to ensure combustion processes as perfect as possible, with short flames, the aim of the present invention is to replace the static pressure prevailing at 6, which in the present construction is greater than that of the combustion chamber, by a lower static pressure, equal to or very close to that of the said combustion chamber, so that at 6 the flow of the air will be characterized by speed rather than by pressure, and this not only enables the diameter of the flame to develop more rapidly and the length of the flame to be reduced, but also assists the evaporation and thus the oxidation of the fuel; this system also enables the form taken by the flame to be progressively regulated, owing to the increased efficiency of the operation of the flame-guiding blades, resulting from the increase taking place in the speed of the air at the moment when the latter passes through them.

Figure 8:
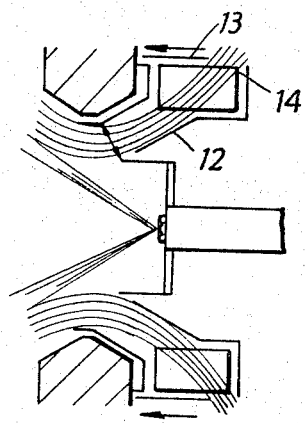

For this purpose, the invention aims at a very considerable reduction in the effective area of the flame-guiding blades, and consequently in the real cross-section for the passage of the air through these blades and also makes it possible, if desired, to facilitate the flow of the air by providing, between the central part rear of the flame-guiding blades and the flame deflector, a screen 12, as shown in FIG. 8, which prevents the induced eddies and the re-injections of air, parallel to the axis.

To enable this considerable reduction to be made in the effective area of the flame-guiding blades while at the same time enabling these latter to continue to act as eddy regulators instead of performing a mixed function combining the control of the cross-section for the passage of the air with an inevitable modification of the turbulence, the invention provides for a cylindrical casing 13 to be mounted outside the flame-guiding blades, its purpose being to regulate the cross-section for the passage of the air 14 independently of the flame-guiding blades and to ensure a suitable flow of air through these latter, resulting not only in the desired degree of turbulence but also in the low static pressure in the neck of the distributor, these two factors being the conditions for satisfactory combustion.

The movement of the said cylindrical casing can range from total closure to the position by which the deliveries of air are equilibrated between a number of items of apparatus mounted in one and the same airbox, including all the intermediate settings, and this makes it possible, either to seal off an item of apparatus effectively, which cannot be effected with the operation of the flame-guiding blades, as the multiplicity of their lines of contact makes it impossible to obtain satisfactory hermeticity, or to fix the optimum cross-section for regulation and equilibration between a number of items of apparatus once and for all, or to modify the cross-section for the passage of the air during the variations taking place at this speed, in order to obtain the best results where the combustion is concerned.

All these objects are achieved without necessarily having to modify the position of the flame-guiding blades, consequently without having to modify the turbulence.

Figure 9:
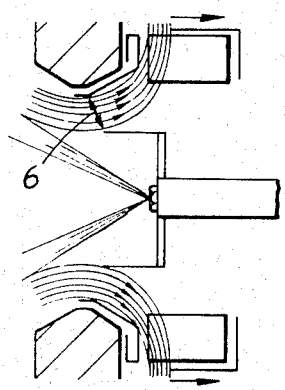

The provision of a cylindrical casing for regulating the cross-section for the passage of the air would only give the present invention a relative degree of novelty were it not for the fact that the opening of the passage for the air is caused to take place at the rear of the flame-guiding blades, this part being the farthest away from the centre of combustion, so that the opening of the casing is effected not by moving towards the rear, as would be the case in the system shown in FIG. 9, but by moving it towards the front, in such a way, that, as shown in FIG. 8, air passes in a diagonal, longitudinal and centripetal direction, through the air guiding blades.

The fact is that this arrangement is indispensable, since both experience and theory show that the provision of an opening in front of the air guiding blades, which opening would cause the air to move in a centripetal direction very close to the direction perpendicular to the axis, as indicated in FIG. 9, would not enable the desired central low pressure to be obtained at 6.

Similarly, if the air guiding blades were not situated in front of the equipment, the convergent-divergent hyperboloid of the streams of air, required for satisfactory combustion, would be replaced by an exclusively divergent hyperboloid, and the desired result would not be obtained.

To ensure satisfactory hermeticity, when the cylindrical casing is used at 1 (to enable items of apparatus not in operation to be sealed off) the casing can be equipped on its lateral surfaces, as shown in FIG. 10, with rigid or flexible "flat" sealing devices 15 and 16, rendering it unnecessary to have recourse to an illusory hermeticity between surfaces sliding against one another.

It is under these conditions that the present invention provides for the adoption, around the air guiding blades constructed in a known manner, of a casing 17 which can be operated in a longitudinal direction, so that in its movement towards the front it exposes, around the air guiding blades, an annular cross-section of the passage of the air, regulating the delivery of the latter, and at the same time causing it to pass at a considerable speed through the air guiding blades in the direction of their convergent diagonal line.

The casing thus provided may perform any of the following functions:

To regulate the combustion at any moment;

To equilibrate the deliveries of air between a number of items of apparatus installed in one and the same airbox;

The total closure of an item of apparatus.

In this latter case it is equipped with the known rigid or flexible "flat" sealing devices.

The entire system is constructed in such a manner as to enable the deliveries of air to be regulated and the individual units of apparatus to be sealed off by the cylindrical casing and not by the operation of air-guiding blades.

To facilitate the flow of air, a conical screen 18 between the air guiding blades and the central deflector is provided as an accessory and either with or without a reduced opening at 19 for the supply of air to the deflector 20. The assembly is completed by a control system 21 for the air guiding blades.

I claim:

1. In a burner for finely divided solid, liquid or gaseous fuel, having central fuel delivery means surrounded by peripheral air guiding blades, the improvement comprising the combination of:
    (a) means for adjusting the angle of inclination of said blades to direct air toward said delivery means in the direction of a flame supported thereon and in a centripetal, longitudinal and tangential direction against fuel emerging from said delivery means;
    (b) an axially adjustable cylindrical casing surrounding said blades which increases air flow through said blades as said casing is moved in the direction of a flame supported on said delivery means, said increased air flow impinging upon the portion of said blades remote from said flame; and
    (c) a conical screen between said blades and said fuel delivery means diverting air around both ends thereof.

References Cited

UNITED STATES PATENTS

| 1,878,926 | 9/1922 | Yarrow | 158—1.5 X |
| 2,055,331 | 9/1936 | Bredtschneider | 158—1.5 X |
| 2,334,314 | 11/1943 | Campbell | 158—1.5 |
| 3,145,670 | 8/1964 | Copian et al. | 158—1.5 X |
| 3,154,131 | 10/1964 | Leach et al. | 158—1.5 |

FOREIGN PATENTS

| 1,360,069 | 3/1964 | France. |

FREDERICK L. MATTESON, JR., *Primary Examiner.*

E. G. FAVORS, *Assistant Examiner.*